July 23, 1935.   F. C. LINDVALL   2,009,114
SURGE RESPONSIVE DEVICE
Filed July 6, 1933
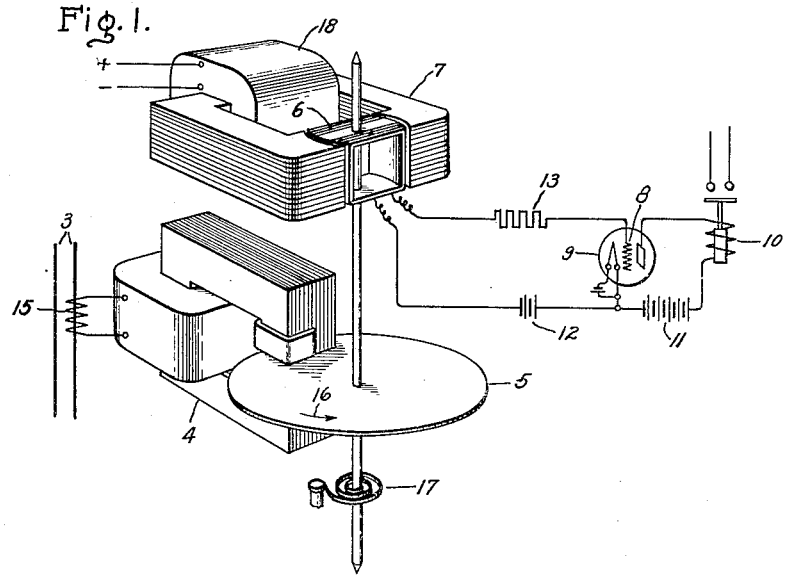
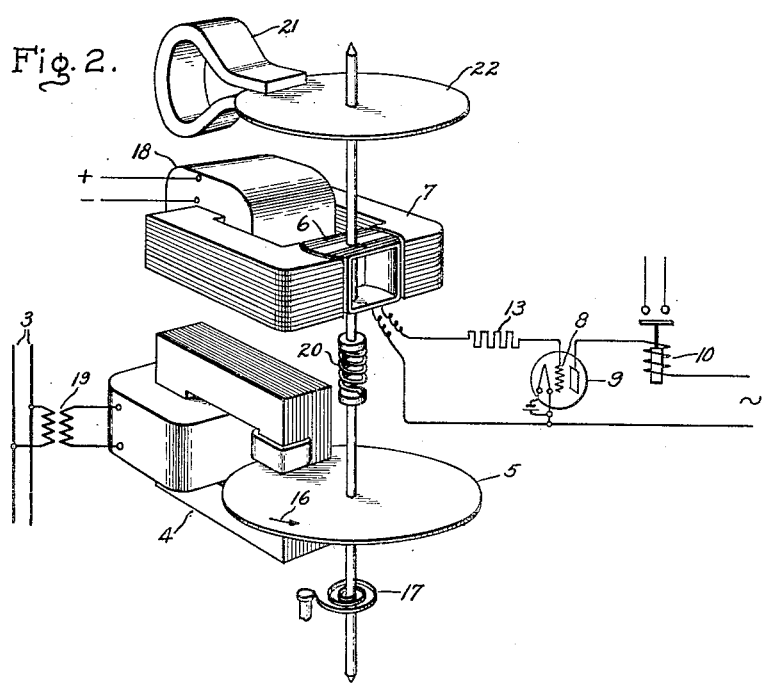
Inventor
Frederick C. Lindvall
by Harry E. Dunham
His Attorney.

Patented July 23, 1935

2,009,114

UNITED STATES PATENT OFFICE 2,009,114

SURGE RESPONSIVE DEVICE

Frederick C. Lindvall, Pasadena, Calif., assignor to General Electric Company, a corporation of New York Application July 6, 1933, Serial No. 679,189

8 Claims. (Cl. 175—294)

My invention relates to improvements in surge responsive devices and more particularly to relaying devices which operate in response to the rate of change of any quantity whose variation can be used to effect a voltage change. An object of my invention is to provide an improved surge responsive device which is very sensitive to sudden changes of a quantity but relatively insensitive to gradual or slow changes of the quantity and which is comparatively simple in its construction and operation.

My invention will be better understood from the following description when considered in connection with the accompanying drawing and its scope will be pointed out in the appended claims.

In the accompanying drawing, Fig. 1 illustrates an embodiment of my invention partly in diagram and partly in perspective and Fig. 2 similarly illustrates another embodiment of my invention.

In accordance with my invention surges of any quantity, whose variation is adaptable to effect a voltage change, may be detected and applied to useful purposes. Thus, for example, as shown in Fig. 1, sudden changes of the current of an electric circuit 3 may be ascertained by suitable current responsive means such as a shaded pole motor device 4 whose movable member or disk 5 is arranged to control the movement of suitable current conducting means, such as a winding 6, mounted for movement in the field of a suitable magnet 7. By induction, movement of the winding 6 produces a voltage change which is dependent on the velocity of the movement and which is applied to the control electrode means 8 of an electric discharge valve 9 to control the conductivity thereof.

The output of the valve 9 may be employed to energize any suitable relaying means 10 connected in the anode circuit of the valve for alarm or indicating purposes or otherwise. The anode circuit includes a suitable source of current 11. Depending on the grid characteristic of the valve, its grid circuit may include a biasing source 12 such that the tube will become conductive only when a certain voltage is induced in the winding 6. Suitable current limiting means, such as a resistance 13, may be used to prevent undesirable current flow in the grid circuit.

The shaded pole motor element 4 is connected in series relation with the circuit 3 through a current transformer 15 and tends to turn the disk 5 in the direction of the arrow 16 and against the bias of a spring 17. The magnetic means 7, although it could be a permanent magnet, is shown as an electromagnet having an energizing winding 18 which may be connected to a direct current source in order to provide a unidirectional field across the gap in which the winding 6 is movable.

Assuming a sudden change of current in the circuit 3, for example an increase, then the disk 5 and therefore the winding 6 will be quickly moved in the direction of the arrow 16. The electromotive force thereby induced in the winding 6 will overcome the bias of the source 12 and render the valve 9 conductive whereby to actuate the relay 10. If the current of the circuit 3 were to decrease, the spring 17 would move the disk 5 and therefore the winding 6 in a direction opposite to that indicated by the arrow 16. In this case, the voltage on the grid 8 would be made more negative and the valve 9 would not conduct. Obviously, the valve 9 may be rendered conductive for either a sudden increase or decrease of current depending on how the winding 6 is connected to the grid 8. If operation is desired on both increase and decrease of current two devices similar to that shown in Fig. 1 may be employed, the connections of the winding 6 to the grid 8 in one device being reversed relatively to those in the other device.

The embodiment of my invention shown in Fig. 2 is connected to respond to voltage surges in a circuit 3 through a potential transformer 19. In this embodiment of my invention the winding 6 is driven through suitable energy storing means such as a spring 20 and its motion is retarded by suitable means, such as a damping magnet 21, acting on a disk 22.

With this arrangement it will be obvious that a sudden movement of the disk 5 tends to store energy in the spring 20. By reason of the damping this energy will be somewhat slowly dissipated and the induced electromotive force applied to the grid 8 will last for a time approximately proportional to the change in the quantity measured by the device 4. Therefore, if an alternating current source be connected in the anode circuit of the valve 9, as shown, and the valve is of the so-called arc discharge type, anode current flow will persist as long as the voltage induced in the winding 6 continues of sufficient magnitude.

If it is desired that the relay 10 of Fig. 1 remain energized or in effect sealed-in once it is operated, then the valve 9 may be of the discontinuous control type such as an arc discharge valve. In this case direct current is supplied to the anode. On the other hand, if the relay is to be energized only while the winding 6 is in motion, then the valve 9 may be of the arc-discharge type and have alternating current applied to its anode, as shown in Fig. 2.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In combination, an electric discharge valve, means for controlling the conductivity of said valve in accordance with the rate of change of a quantity including a voltage inducing means and means for actuating said voltage inducing means in response to the rate of change of said quantity.

2. A device responsive to surges in a quantity including movable means for generating a voltage proportional to the magnitude of a surge in the quantity, an electric discharge valve and means for controlling the conductivity of said valve in accordance with said voltage.

3. In combination, an electric discharge valve having a control electrode, means for impressing on said control electrode a voltage dependent on the rate of change of a quantity to control the conductivity of the valve including a current conducting means mounted for movement in a magnetic field and connected in circuit with the control electrode of said valve and means for moving said current conducting means at a velocity dependent on the rate of change of said quantity.

4. In combination, an electric discharge valve of the discontinuous control type having a control electrode, means for impressing on said control electrode a voltage dependent on the rate of change of a quantity to control the conductivity of the valve including a current conducting means mounted for movement in a magnetic field and connected in circuit with the control electrode of said valve, means for moving said current conducting means at a velocity dependent on the rate of change of said quantity and a device to be operated and a source of direct current connected in the anode circuit of said valve.

5. In combination, an electric discharge valve having a control electrode and an anode, a device to be controlled connected in the anode circuit of said valve and means for controlling the conductivity of said valve in accordance with a sudden change in a quantity of electric energy including a winding mounted for movement in a unidirectional magnetic field and connected in circuit with the control electrode of said valve, actuating means for moving said winding in response to a change in said electric quantity, a resilient connection between said actuating means and the mounting of said winding, and means for retarding the movement of said winding.

6. In combination, an electric discharge valve having a control electrode and an anode, a device to be controlled connected in the anode circuit of said valve and means for controlling the conductivity of said valve in accordance with a sudden change in a quantity of electric energy including a winding mounted for movement in a unidirectional magnetic field and connected in circuit with the control electrode of said valve, and means for moving said winding in response to a change in said electric quantity.

7. In combination, an electric valve of the arc discharge type having a control electrode, means for impressing on said control electrode a voltage dependent on the rate of change of a quantity to control the conductivity of the valve including a current conducting means mounted for movement in a magnetic field and connected in circuit with the control electrode of said valve, means for moving said current conducting means at a velocity dependent on the rate of change of said quantity and for a time approximately proportional to the change of the quantity, and a device to be operated and a source of alternating current both connected in the anode circuit of said valve.

8. A device responsive to surges in a quantity including operating means connected to be actuated by a change in the quantity, movable means connected to be actuated by said operating means for generating a voltage varying with the magnitude of the surge in the quantity and means connected to be operated in response to said voltage.

FREDERICK C. LINDVALL.